United States Patent [19]
McFadden

[11] 3,723,550
[45] Mar. 27, 1973

[54] PURIFICATION OF VINYL CHLORIDE

[75] Inventor: Russell Thomson McFadden, Freeport, Tex.

[73] Assignee: The Dow Chemical Company, Midland, Mich.

[22] Filed: Aug. 10, 1970

[21] Appl. No.: 62,724

[52] U.S. Cl. ............................................. 260/656 R
[51] Int. Cl. ................................................ C07c 21/06
[58] Field of Search ....... 260/656 R, 656 AC, 652 P, 260/654 S

[56] References Cited

UNITED STATES PATENTS

| | | | |
|---|---|---|---|
| 3,125,607 | 3/1964 | Keating et al. | 260/656 R |
| 3,125,608 | 3/1964 | McDonald | 260/656 R |
| 3,125,609 | 3/1964 | Montgomery | 260/656 R |
| 3,548,014 | 12/1970 | Jacobowski et al. | 260/656 R |

FOREIGN PATENTS OR APPLICATIONS

| | | | |
|---|---|---|---|
| 623,964 | 10/1962 | Belgium | 260/656 R |

*Primary Examiner*—Leon Zitver
*Assistant Examiner*—Joseph A. Boska
*Attorney*—Griswold & Burdick and Raymond B. Ledlie

[57] ABSTRACT

A method for removing unsaturates, particularly diolefins such as butadiene, from vinyl chloride, by contacting the impure vinyl chloride with catalytic amounts of a Lewis Acid such as aluminum chloride.

3 Claims, No Drawings

PURIFICATION OF VINYL CHLORIDE

The present invention relates to a novel and improved method for purifying impure vinyl chloride by removing certain unsaturated impurities therefrom and more particularly relates to a method for removing diolefins such as butadiene from vinyl chloride without a significant deleterious effect upon the vinyl chloride.

For some time the problem of contamination of vinyl chloride with other unsaturated compounds has been recognized and numerous processes have been proposed to effectively remove such impurities. By way of illustration, U.S. Pat. No. 3,125,607 shows a process whereby the impure vinyl chloride is chlorinated at low temperatures to convert the butadiene contained therein to the more easily separated chlorinated derivates. U.S. Pat. No. 3,125,608 provides butadiene removal by hydrogenating the impure vinyl chloride at high temperature and pressure in the presence of a supported Group VIII metal catalyst. U.S. Pat. No. 3,125,609 shows the catalytic removal of butadiene by contacting the impure vinyl chloride at elevated temperature with cupric chloride supported on an inert substrate such as alumina. Other methods such as selective solvent extraction to remove acetylenic and dienic compounds are likewise known.

It is an object of this invention to provide a novel and improved process for the purification of vinyl chloride. A further object is to provide a method whereby diolefins and other unsaturated impurities are removed from vinyl chloride at moderate conditions of temperature and pressure by employing an improved catalyst. These and other objects and advantages of the present process will become apparent from a reading of the following detailed description of the invention.

It has now been discovered that 1,3-butadiene and other undesirable impurities are removed from vinyl chloride at moderate conditions of temperature and pressure by contacting the impure vinyl chloride with a catalytic amount of a Lewis Acid.

The Lewis Acids suitable as catalysts herein include aluminum chloride, hydrocarbon complexes of aluminum chloride, aluminum bromide, aluminum iodide, ferric chloride, ferric bromide, ferric iodide, stannic chloride, stannic bromide, stannic iodide, zinc chloride, zinc bromide, zinc iodide, zirconium tetrachloride, titanium tetrachloride, boron trifluoride, and the like. In general, it is preferred to employ $AlCl_3$, $FeCl_3$, $BF_3$ or their soluble complexes as the catalyst. Aluminum chloride and the hydrocarbon complexes of aluminum chloride have been found particularly suitable in many instances.

Such Lewis Acid catalysts are usually employed in concentrations of from about 0.5 to about 2.0 percent by weight based on the total weight of the mixture. The proportion of catalyst which is most effective varies somewhat based on the conditions employed and on the activity of the particular Lewis Acid employed. Concentrations of catalyst in excess of 2.0 wt. percent may be employed but, in general, no advantage is gained thereby.

It is generally preferred to employ a temperature during the catalytic reaction step of between about 40 and about 75°C. At temperatures less than about 40°C., the activity of the catalyst decreases markedly and at temperatures above about 75°C., high autogenous pressures are generated and side reactions, particularly dehydrochlorination reactions, are promoted.

For effective removal of diolefins, it is important to provide a molar ratio of catalyst to diolefin of between about 1:5 to about 1:25, preferably from about 1:5 to about 1:20. Catalyst concentrations higher than about 1:5 result in excessive vinyl chloride losses and concentrations lower than about 1:25 lose effectiveness in diolefin removal.

Contact times between the vinyl chloride and the catalyst which are sufficient to reduce the level of impurities may vary over a wide range depending on a number of factors such as effectiveness of mixing, impurities present, catalyst employed, reaction conditions and degree of impurity removal which is desired. In general, effective contact times are from about 1 minute to about 60 minutes with from 5 minutes to 15 minutes frequently being preferred.

The most commonly encountered impurity in vinyl chloride and usually the impurity present in the highest concentration is 1,3-butadiene. In addition to removing this impurity to low levels, however, the present invention likewise significantly reduces the concentration of other unsaturates such as chloroprene and vinyl acetylene.

The catalytic reaction employed to remove the diolefin from vinyl chloride is preferably conducted at autogenous pressure but additional pressure may be employed to maintain the vinyl chloride in the liquid phase and therefore in contact with the catalyst.

One preferred method of conducting the process of the present invention is to add the impure vinyl chloride to a pressure vessel, admix the Lewis Acid catalyst therewith, agitate the mixture under autogenous pressure at a temperature of between about 40°C. and about 75°C. for a time sufficient to reduce the diolefin content to the desired level and remove the purified vinyl chloride from the vessel. Separation of the vinyl chloride from the catalyst and from the heavies produced thereby is easily achieved by distillation. This process may be conducted either as a batch process or continuously.

EXAMPLE 1

A mixture of impure vinyl chloride and other chlorinated hydrocarbons was employed which had the following composition as determined by vapor phase chromatography:

| | |
|---|---|
| vinyl chloride | 72.5% by weight |
| vinyl acetylene | 400 ppm |
| chloroprene | 1,900 ppm |
| 1,3-butadiene | 430 ppm |
| 1,2-dichloroethylene (cis and trans) | 0.53% by weight |
| vinylidene chloride | 10.8% |
| trichloroethylene | 0.37% |
| other saturated chlorocarbons | balance |

Mixtures of this impure vinyl chloride with varying amounts of the Lewis Acid catalysts were made by passing the impure vinyl chloride into a dry ice/acetone bath cold-trap, and then pouring the cold liquid into chilled heavy-walled glass pressure ampoules to give a weight of 100 gm per ampoule. To each was then added the weights of metallic halides shown below:

| Experiment Designation | Stannic Chloride | Aluminum Chloride | Ferric Chloride |
|---|---|---|---|
| A | 1.0 gm. | | |
| B | | 0.2 gm | |
| C | | 1.0 gm | |
| D | | | 0.25 gm |

E 0.50 gm
F 0.99 gm
G 2.00 gm

The ampoules were then sealed, warmed slowly to 25°C., and then tumbled at 70°C. for 60 minutes. The liquids were found to have the following compositions:

|  | A | B | C | D | E | F | G |
|---|---|---|---|---|---|---|---|
| Vinyl chloride, percent | 71.6 | 73.2 | 70.7 | 73.6 | 73.5 | 72.8 | 71.2 |
| Vinyl acetylene, p.p.m. | 480 | 380 | <10 | 340 | 280 | 290 | 77 |
| Chloroprene, p.p.m. | 1,800 | 1,600 | <25 | 1,400 | 800 | <25 | <25 |
| 1,3-butadiene, p.p.m. | <50 | <50 | <50 | <50 | <50 | <50 | <50 |
| 1,2-dichloro-ethylenes percent | .52 | .51 | .55 | .51 | .51 | .51 | .54 |
| Vinylidene chloride, percent | 11.0 | 10.5 | 11.0 | 10.3 | 10.4 | 10.6 | 10.6 |
| Trichloroethylene, percent | .39 | .38 | .40 | .38 | .37 | .37 | .42 |
| Other chlorocarbons | Bal. | Bal. | Bal. | Bal. | Bal. | Bal. | Bal. |

EXAMPLE 2

In the same manner as Example 1, mixtures were prepared containing 1.0 percent aluminum chloride. These mixtures were tumbled at 70°C. for 1, 10, 20, and 60 minutes and the products had the following composition:

|  | 1 min. | 10 min. | 20 min. | 60 min. |
|---|---|---|---|---|
| Vinyl chloride,% | 72.1 | 70.3 | 65.0 | 70.9 |
| Vinyl acetylene,ppm | 170.0 | 130.0 | 40.0 | 27.0 |
| Chloroprene,ppm | <25.0 | <25.0 | <25.0 | <25.0 |
| 1,3-Butadiene,ppm | <10.0 | 24.0 | 10.0 | <10.0 |
| 1,2-Dichloroethylenes,% | .52 | .57 | .64 | .63 |
| Vinylidene chloride | 10.7 | 11.0 | 12.6 | 10.8 |
| Trichloroethylene | .38 | .42 | .48 | .39 |
| Other chlorocarbons | Bal. | Bal. | Bal. | Bal. |

EXAMPLE 3

In the procedure of Example 1, mixtures were prepared containing 0.50 weight percent of aluminum chloride and tumbled at 45°C. for 5, 10, 20 and 40 minutes. The products had the following composition:

|  | 5 min. | 10 min. | 20 min. | 40 min. |
|---|---|---|---|---|
| Vinyl chloride,% | 72.6 | 73.4 | 73.1 | 73.3 |
| Vinyl acetylene,ppm | 190.0 | 170.0 | 170.0 | 180.0 |
| Chloroprene,ppm | <25.0 | <25.0 | <25.0 | <25.0 |
| 1,3-Butadiene,ppm | <10.0 | <10.0 | <10.0 | <10.0 |
| 1,2-Dichloroethylenes,% | .53 | .52 | .53 | .55 |
| Vinylidene chloride,% | 10.8 | 10.5 | 10.6 | 10.5 |
| Trichloroethylene,% | .39 | .46 | .36 | .41 |
| Other chlorocarbons | Bal. | Bal. | Bal. | Bal. |

EXAMPLE 4

In the same manner as Example 1, a liquid, soluble complex of aluminum chloride was added to 100 gm. quantities of impure vinyl chloride. The complex was prepared by mixing at about 70°—80°C. a mixture of 1.0 mol of aluminum chloride, 2.0 mols of benzene, and 1.0 mol of diethyl benzene. The vinyl chloride mixtures, in which the catalyst complex was freely soluble, were tumbled at 70°C. for 1 hour. Results were as follows:

|  | Concentration of Complex | | | |
|---|---|---|---|---|
|  | 1.0% | 2.0% | 3.0% | 4.0% |
| Vinyl chloride,% | 72.0 | 70.5 | 69.6 | 66.5 |
| Vinyl acetylene,ppm | 80.0 | 70.0 | 50.0 | 70.0 |
| Chloroprene,ppm | <25.0 | <25.0 | <25.0 | <25.0 |
| 1,3Butadiene,ppm | 9.0 | 11.0 | 9.0 | 8.0 |
| 1,2Dichloroethylenes,% | 1.06 | 1.5 | 1.9 | 2.4 |
| Vinylidene chloride,% | 10.6 | 10.6 | 10.3 | 10.3 |
| Trichloroethylene,% | .39 | .38 | .38 | .44 |
| Other chlorocarbons | Bal. | Bal. | Bal. | Bal. |

EXAMPLE 5

A 1-gallon stainless-steel pressure vessel was built equipped for continuous metered input of impure vinyl chloride, having the composition shown in Example 1, and the aluminum chloride liquid complex catalyst, as prepared in Example 4, for internal temperature control from 25° to 120°C., for pressure operation up to 200 psig, and for continuous liquid phase removal. This reactor was operated continuously so as to pump into the reactor 2.0 ml/minute of catalyst as a 50 volume percent solution in o-dichlorobenzene and 0.11 lb/minute of vinyl chloride. Throughout the operation the temperature of the liquid in the reactor was maintained at 70°C. and the vapor pressure at about 100 psig. Liquid was withdrawn continuously so as to maintain a liquid volume in the reactor of about ½ gallon. Samples were taken every 30 minutes during a two hour period, and analyzed as follows:

|  | First sample | Second sample | Third sample | Fourth sample | Orig. liquid |
|---|---|---|---|---|---|
| Vinyl Cl,% | 64.4 | 72.0 | 67.8 | 70.4 | 73.4 |
| Vinyl acetylene,ppm | 200.0 | 190.0 | 165.0 | 190.0 | 320.0 |
| Chloroprene,% | 0.44 | 0.58 | 0.84 | 0.76 | 1.50 |
| 1,3-Butadiene,ppm | 28.0 | 53.0 | 140.0 | 65.0 | 660.0 |
| Catalyst content,% | 1.04 | 0.76 | --- | 0.57 |  |
| Average contact time | ← 15 minutes → | | | | |

I claim:

1. A process for the purification of vinyl chloride which comprises contacting in the liquid phase, vinyl chloride containing diolefin impurities with a catalytic quantity of a Lewis Acid Catalyst selected from the group consisting of $AlCl_3$, $FeCl_3$, $BF_3$ and soluble complexes thereof at a temperature of between about 40°C. and about 75°C., under autogenous pressure for a time sufficient to reduce the diolefin content thereof by conversion of the diolefins to heavies, and thereafter separating the vinyl chloride from the heavies and catalyst.

2. The process of claim 1 wherein the concentration of the catalyst is from about 0.5 to about 2.0 weight percent of the total weight of the mixture.

3. The process of claim 1 wherein the molar ratio of catalyst to diolefin in the impure vinyl chloride is from about 1:5 to about 1:25.

* * * * *